United States Patent Office 3,137,671
Patented June 16, 1964

---

3,137,671
PROCESS FOR THE PRODUCTION OF COLORED POLYURETHANE PLASTICS
Hans Heinrich Bosshard, Binningen, Anton Elsener, Birsfelden, Franz Wirsching, Allschwil, and Heinrich Zollinger, Binningen, Switzerland, assignors to Ciba Limited, Basel, Switzerland, a Swiss firm
No Drawing. Filed Mar. 16, 1959, Ser. No. 799,443
Claims priority, application Switzerland Mar. 18, 1958
1 Claim. (Cl. 260—37)

It is known that the polyaddition of organic compounds containing reactive hydrogen atoms with organic polyisocyanates leads to the formation of valuable plastics, which can be used for a very wide variety of purposes, for example, for the manufacture of moulded bodies, foils, fibrous materials, foamed materials, or coating compositions. It is also known to use pigments which are insoluble in organic solvents for the production of colored polyurethane plastics. However, as disclosed in German Patent No. 1,028,771 of October 1, 1955 to Farbenfabriken Bayer-Aktiengesellschaft, Leverkusen-Bayerwerk, Germany, the use of such pigments is attended by various disadvantages. For example, in order to bring about a uniform fine state of division of the pigment it must be dispersed in, or ground with, the component containing a reactive hydrogen atom, which necessitates the use of costly apparatus. Furthermore, in many cases the properties of fastness of polyurethanes colored with pigments do not fulfil practical requirements. The fact that many of the pigment dyestuffs bleed and have a poor fastness to migration, over-stripe bleeding, and extraction renders them useless for coloring polyurethanes.

The present invention is based on the observation that uniformly colored polyurethane plastics which are fast to bleeding, migration, over-strip bleeding, and extraction, are obtained by incorporating, before or during the polyaddition, an organic dyestuff which contains at least one di-hydroxyethylamino group capable of reacting with the isocyanate under the conditions of the polyaddition.

As organic compounds containing reactive hydrogen atoms there are advantageously used polyesters of high molecular weight which contain hydroxyl groups, and especially such polyesters obtained from a dicarboxylic acid, for example, adipic acid, maleic acid, or phthalic acid, and a glycol, glycerine, trimethylol-propane, hexane-triol-(1:2:6)-diethylene glycol or thiodiglycol. Instead of polyesters there may be used polyethers containing hydroxyl groups.

Instead of compounds containing hydroxyl groups there may be used compounds containing amino, mercapto or carboxyl groups, or compounds containing two or more of these different kinds of groups, for example, hydroxyl and carboxylic acid groups.

The term "polyisocyanates" includes compounds which contain at least two isocyanate groups, and especially aryl diisocyanates, for example, naphthylene-1:5-diisocyanate, diphenyl methane diisocyanate and especially those of the benzene series, for example, phenylene-1:4-diisocyanate or 1-methyl-phenylene-2:4 diisocyanate, or meta- or para-xylene diisocyanate, or triisocyanates, for example, compounds of the formula

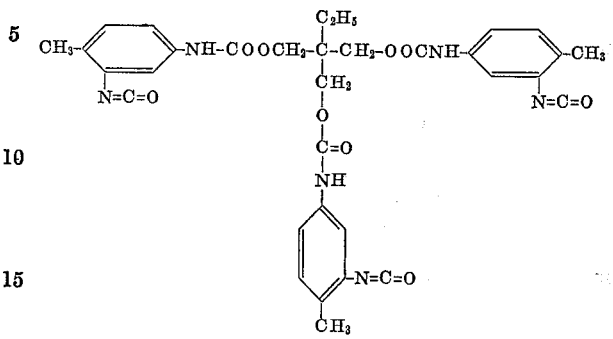

As suitable dyestuffs there may be mentioned, for example, triphenyl methane, oxazine, thiazine, nitro, methine, or phthalocyanine dyestuffs and especially azo-dyestuffs or anthraquinone dyestuffs, and which dyestuffs contain a di-hydroxyethylamino group. Said group may be bound to an aromatic nucleus of the dyestuff molecule directly or through a bridge member, for example, an alkylene group, an alkylene-amino group, an imino group or a —CO— or —SO$_2$— group, for example, as in the

—SON(CH$_2$—CH$_2$—OH)$_2$ or

—CON(CH$_2$—CH$_2$—OH)$_2$ group.

Among the azo-dyestuffs there may be mentioned, for example, disazo-dyestuffs, and especially monoazo-dyestuffs, for example, those of the benzene-azo-benzene, benzene-azo-pyrazolone, benzene-azo-acetoacetic acid arylide or benzene-azo-naphthalene series. In addition to the above defined di-hydroxyethylamino groups, the aforesaid monoazo-dyestuffs may contain further substituents of the kind customary in azo-dyestuffs and which do not react with isocyanates or react therewith considerably more slowly than the aforesaid groups, for example, halogen atoms or alkyl trifluoromethyl, phenolic hydroxyl groups, or alkoxy, acylamino, arylamino, dialkylamino, alkyl-sulfone, carboxylic acid ester, carboxylic acid, sulfonic acid, or cyano groups.

As examples of suitable azo-dyestuffs there may be mentioned dyestuffs of the formulae

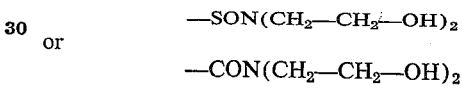

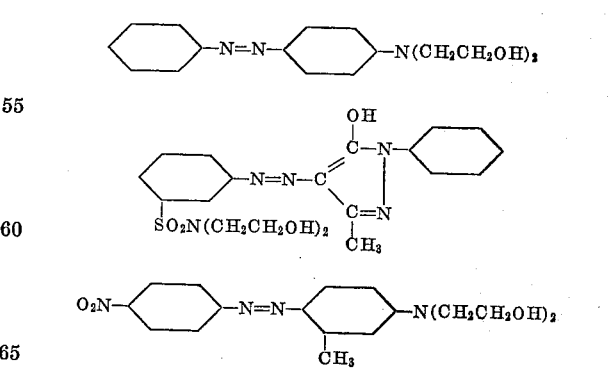

or

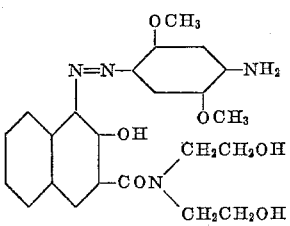

Complex metal compounds of azo-dyestuffs can also be used in the process of this invention, for example, the complex chromium or cobalt compounds of the monoazo-dyestuffs of the formula

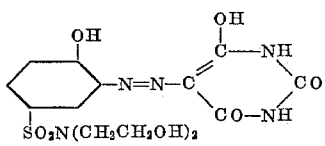

or

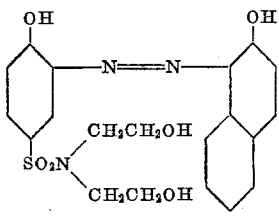

As examples of phthalocyanine dyestuffs there may be mentioned copper phthalocyanine tetra (sulfonic acid dihydroxyethylamide), and as an example of a triphenylmethane dyestuff there may be mentioned the dyestuff of the formula

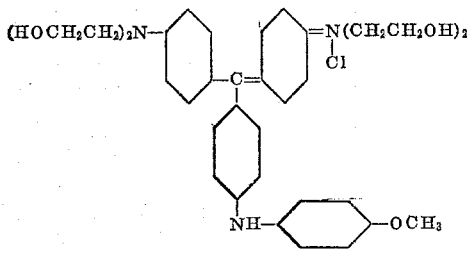

For use in the process the dyestuff is advantageously dissolved in an inert organic solvent with good solvent power for the dyestuff, for example, acetone, methyl ketone, ethylacetate, benzene, toluene, nitrobenzene or especially dimethyl-formamide. The dyestuff solution may be incorporated either with the polyhydroxy-compound or with the polyisocyanate component or with the mixture of these two components. In general it is desirable not to use more than 0.05 mol of dyestuff per mol of the polyisocyanate compound. In most cases very strong colorations are produced with a small proportion of the dyestuff, for example, 0.01 mol of dyestuff per mol of polyisocyanate compound.

When the colored polyurethane plastics obtained by the process of this invention for example after dry grinding are to be used as pigments, it is of advantage to use a very large proportion of dyestuff, that is to say, at least 0.1 mol of dyestuff per mol of polyisocyanate. In certain cases it is of advantage to mix the dyestuff solution with a solution of the polyisocyanate component, allow the mixture to stand for a few hours, and then to incorporate the polyhydroxy-compound with the mixture.

The dyestuffs may be used in conjunction with pigments, especially white pigments, for example, titanium dioxide or a fluorescent body. Instead of using a single dyestuff of the kind used in the process of the invention, a mixture of such dyestuffs may be used.

The polyaddition is carried out by the usual methods and may be accelerated by the use of a catalyst, especially a tertiary amine, for example, N-methyl-morpholine, triethylamine or pyridine.

Colored polyurethanes produced by the process of this invention are useful for a very wide variety of purposes, for example, as coating materials, foamed materials or textile coating compositions. As the dyestuff is chemically combined in the polyurethane the colorations are fast to migration and solvents. The dyestuff cannot be extracted even by heating the colored material in a solvent for several hours.

As compared with colorations produced with pigment coloring matters which are insoluble in organic solvents, the colorations produced by the process of this invention have a higher brilliance. Furthermore, there is no fear of the dyestuff bleeding out. The colored polyurethanes of this invention can also be used as pigments, after converting the colored polyurethane into a finely divided form.

The following examples illustrate the invention, the parts and percentages being by weight:

*Example 1*

20 parts of a medium viscous polyester from adipic acid and triethylene glycol, known by the trade name "Desmophen 2200" [see Bayer: "Kunststoffe," 1955, page 36] and 6.5 parts of a mixture of toluene-2:4-diisocyanate and toluene-2:6-diisocyanate are mixed with 1 part of a 10% solution of 4-amino-azobenzene in toluene.

The following are then stirred in: 1.9 parts of a mixture of 1 part of distilled water, 1.5 parts of a polyglycol ether, and 3 parts of a basic catalyst, for example ethylmorpholine.

Reaction sets in spontaneously and yields a yellow foamed polyurethane product.

It was found impossible to remove the dyestuff from the foamed product by extraction with solvents.

For the purpose of comparison foamed products dyed with para-acetaminobenzene were prepared under identical conditions. It was possible to wash this dyestuff out of the foamed product by extraction.

*Example 2*

133 parts of a medium viscous polyester from 13 mols of adipic acid, 2 mols of glycerine and 3 mols of butylene glycol, known by the trade name "Desmophen 1100" [see Bayer: "Angewandte Chemie," 59, page 264 (1947)] and 150 parts of a mixture of toluene-2:4-diisocyanate and toluene-2:6-diisocyanate are mixed with 50 parts of a solution of 10% strength of 2:4-diamino-4'-dimethylamino-azobenzene in dimethyl-formamide. The colored coating material prepared in this manner is used to coat paper with a wet coating 0.2 mm. thick by means of a film casting apparatus. The lacquer film was allowed to harden at room temperature for 2 days.

It was not possible to wash the dyestuff out of the film by extraction with solvents.

To test the fastness of the colored coating to over-stripe bleeding it was coated with a nitrocellulose lacquer containing a white pigment. After drying, the top coating was only slightly colored which demonstrates the fastness to over-stripe bleeding of the colored coating.

In column I of the following table are given a number of further dystuffs which, when used in the manner described in this example, produce the tints given in column II which are fast to over-stripe bleeding and extraction.

| | Dyestuff | Tint in polyurethane lacquer |
|---|---|---|
| 1 | Ph—N=N—C₆H₄—N(CH₂CH₂OH)₂ | Yellow. |
| 2 | NC—C₆H₄—N=N—C₆H₃(CH₃)—N(CH₂CH₂OH)₂ | Orange. |
| 3 | CH₃O₂S—C₆H₃(Cl)—N=N—C₆H₃(CH₃)—N(CH₂CH₂OH)₂ | Scarlet. |
| 4 | O₂N—C₆H₄—N=N—C₆H₃(CH₃)—N(CH₂CH₂OH)₂ | Red. |
| 5 | [C₆H₄(SO₂N(CH₂CH₂OH)₂)]—N=N—C(=C(OH)—NH—N=C—CH₃) (pyrazolone with CH₃) | Greenish yellow. |
| 6 | [C₆H₄(SO₂N(CH₂CH₂OH)₂)]—N=N—C(=C(OH)—NH—N=C—COOC₂H₅) | Do. |
| 7 | [C₆H₄(SO₂N(CH₂CH₂OH)₂)]—N=N—C(=C(OH)—N(Ph)—N=C—CH₃) | Yellow. |
| 8 | Chromium complex-from 1 atom of chromium and 2 mols of the monoazo dyestuff of the formula: [C₆H₃(OH)(SO₂N(CH₂CH₂OH)₂)]—N=N—C(=C(OH)—N(Ph)—N=C—CH₃) | Red orange. |
| 9 | Cobalt complex from 1 atom of cobalt and 2 mols of monoazo dyestuff No. 14 | Yellow orange. |
| 10 | Chromium complex from 1 atom of chromium and 2 mols of the monoazo dyestuff of the formula: [C₆H₃(OH)(SO₂N(CH₂CH₂OH)₂)]—N=N—C(=C(OH)—NH—CO—CO—NH) | Orange. |
| 11 | Cobalt complex from 1 atom of cobalt and 2 mols of monoazo dyestuff No. 18 | Yellow. |
| 12 | Chromium complex from 1 atom of chromium and 2 mols of the monoazo dyestuff of the formula: [C₆H₃(OH)(SO₂N(CH₂CH₂OH)₂)]—N=N—[C₁₀H₆(OH)] | Claret. |
| 13 | Cobalt complex from 1 atom of cobalt and 2 mols of monoazo dyestuff No. 23 | Pink. |
| 14 | (HOCH₂CH₂)₂N—[xanthene ring with Cl substituent and C₆H₄—SO₃H]=N(CH₂CH₂OH)₂ | Fluorescent, brilliant, red. |

| | Dyestuff | Tint in polyurethane lacquer |
|---|---|---|
| 15 | (HOCH$_2$CH$_2$)$_2$N—C$_6$H$_4$—C(=C$_6$H$_4$—N(CH$_2$CH$_2$OH)$_2$·Cl)—C$_6$H$_4$—NH—C$_6$H$_4$—OCH$_3$ | Blue. |
| 16 | Copper phthalocyanine tetra [sulfonic acid-di-hydroxyethylamide] | Turquoise blue. |
| 17 | CH$_3$CONH—(benzothiazole)—C—N=N—C$_6$H$_3$(CH$_3$)—N(CH$_2$CH$_2$OH)$_2$ | Red. |
| 18 | O$_2$N—C(—S—)=C(HC=N)—C—N=N—C$_6$H$_3$(CH$_3$)—N(CH$_2$CH$_2$OH)$_2$ | Blue. |
| 19 | (HOCH$_2$CH$_2$)$_2$N—C$_6$H$_3$(NO$_2$)—SO$_2$NH$_2$ | Greenish Yellow |
| 20 | CH$_3$O—C$_6$H$_4$—NH—C$_6$H$_3$(NO$_2$)—SO$_2$N(CH$_2$CH$_2$OH)$_2$ | Yellow. |
| 21 | NC\C$_2$H$_5$OOC/C=CH—C$_6$H$_4$—N(CH$_2$CH$_2$OH)$_2$ | Do. |
| 22 | (benzothiophene-CO)C=CH—C$_6$H$_4$—N(CH$_2$CH$_2$OH)$_2$ | Orange. |
| 23 | NC\(C$_6$H$_4$—SO$_2$)/C=CH—C$_6$H$_4$—N(CH$_2$CH$_2$OH)$_2$ | Greenish yellow. |
| 24 | C$_6$H$_5$—COCH=CH—C$_6$H$_4$—N(CH$_2$CH$_2$OH)$_2$ | Yellow with green fluorescence. |
| 25 | (indolinium: CH$_3$, CH$_3$; N-CH$_3$·Cl)—CH=CH—C$_6$H$_4$—N(CH$_2$CH$_2$OH)$_2$ | Brilliant red. |
| 26 | Cl—(benzothiazole)—C—N=N—C$_6$H$_4$—N(CH$_2$CH$_2$OH)$_2$ | Do. |

Dyestuff No. 14 can be prepared by heating according to German Patent No. 848,231 of July 21, 1950 to Farbwerke Hoechst, vorm. Meister Lucius & Brüning, Frankfurt am Main Hochst 5 parts of 2-sulfo-4′,4″-xanthenium-dichloride with 10 parts diethanolamine at 120° C. in 20 parts of ethylene glycol.

Dyestuff No. 19 can be prepared as described in British Patent No. 598,371 of August 28, 1941 to Manufactures de Produits Chimiques du Nord Etablissments Kuhlmann by heating 1-chloro-2-nitro-4-sulfonamide in an excess of diethanolamine at 120° C.

Dyestuff No. 20 can be prepared as described in U.S. Patent No. 2,466,011 of April 5, 1949 to Joseph B. Dickey et al. by heating 1-chloro-2-nitrobenzene-4-sulfonyl-diethanolamide with 1 mol of 1-amino-4-methoxybenzene in the presence of sodium bicarbonate at 180° C.

Dyestuff No. 21 can be prepared by condensing cyanacetic ester with para-(dihydroxyethylamino)-benzaldehyde in alcohol in the presence of piperidine.

Dyestuff No. 22 can be prepared by boiling 1 mol of 3-hydroxy-thionaphthalene and 1 mol of para-(dihydroxyethylamino)-benzaldehyde in alcohol in the presence of piperidine.

Dyestuff No. 23 can be prepared by heating 1 mol of phenyl-cyanomethyl sulfone with 1 mol of para-(dihydroxyethylamino)-benzaldehyde in an alcoholic solution in the presence of piperidine.

Dyestuff No. 24 can be prepared by heating 1 mol of acetophenone with 1 mol of para-(dihydroxyethylamino)-benzaldehyde in an alcoholic solution in the presence of piperidine.

Dyestuff No. 25 can be prepared by heating 1:3:3-trimethyl-2-methylene indoline (Fischer's base) with para-(dihydroxyethyl-amino)-benzaldehyde in glacial acetic acid at 100° C., dissolving the resulting condensation product in water and precipitating the hydrochloride with sodium chloride and hydrogen chloride.

*Example 3*

1 part (1 mol) of 2:4-tolylene diisocyanate is mixed with 4 parts of dimethyl-formamide, 0.01 part of ethylmorpholine is added and the whole is heated to 100° C. To the hot solution is added dropwise, while stirring, a solution of 0.2 part (0.1 mol) of the dyestuff of the formula

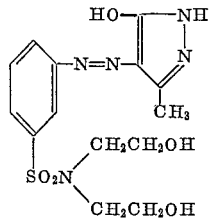

in 4 parts of dimethyl-formamide. On completion of the addition, the mixture is heated at the boil for 4 hours.

After cooling, 5 parts of a polyglycol ether are added which contains at least as many hydroxyl groups as are required to saturate the free isocyanate groups, and the whole is then refluxed for 5 hours. 2 parts of 2:4-tolylene diisocyanate are added, and the mixture is refluxed for a further 6 hours. There is obtained a yellow pigment which is fast to solvents, and, when brought into a state of fine subdivision by grinding, colors polyvinyl chloride brilliant greenish yellow tints of good fastness to migration.

The dyestuff of the above formula is obtained by coupling diazotized 1-amino-3-benzene-sulfonic acid dihydroxyethylamide with 3-methyl-pyrazolone-5.

*Example 4*

Solution I.—100 parts of a reaction product from Desmophen 1100 (see Example 2) and a mixture of toluene 2:4- and 2:6-diisocyanate, known under the trade name "Desmolin" [see Bayer: "Kunststoffe," 1955, page 113] are dissolved in 233 parts of ethyl acetate.

Solution II.—12.75 parts of a reaction product of 1 molecular proportion of trimethylol-propane with 3 molecular proportions of a mixture of toluene-2:4-diisocyanate and toluene-2:6-diisocyanate, for example, the product known under the trade name "Desmodur L" or "Desmodur TH" are dissolved in 4.25 parts of ethyl acetate, and there is added 0.1 part of 2-methyl-4-diethanolamino-4'-nitro-1,1'-azobenzene, dissolved in 5 parts of dimethylformamide.

Solution II is allowed to stand for 12 hours at room temperature. At the end of this period the whole of each of solutions I and II are mixed together, and the mixture is referred to below as solution III. If desired, special catalysts may be added.

The red solution III so obtained is applied by means of a coating apparatus in three layers to a cotton fabric, each layer being dried before the application of the next layer. The first two layers are dried at 120° C. for 10 minutes, and the third layer is dried at 120° C. for 30 minutes.

A fabric, provided in this manner with a colored coating, was allowed to harden completely for 8 days at room temperature, and then tested with regard to resistance to extraction and fastness to migration.

In the test for resistance to extraction the dyestuff could not be extracted from the coated fabric by means of a series of solvents.

The test for fastness to migration was carried out by the sandwich method, in which the colored coating was held in contact with foils of plasticized polyvinyl chloride, regenerated cellulose and acetyl-cellulose at 80° C. under a pressure of 1 kilogram per square centimeter for 24 hours. The foils did not become colored, therefore the colored coating was fast to migration.

What is claimed is:

A process for the production of colored polyurethane plastics obtained by the polyaddition of an organic compound having two to three alcoholic hydroxyl groups with an aromatic polyisocyanate, which comprises incorporating an organic dyestuff which has a substitutent of the formula

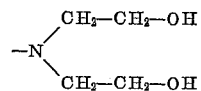

and is dissolved in a solvent which is inert to the dyestuff, thereby bringing about a chemical bond between the dyestuff and the polyurethane.

References Cited in the file of this patent

UNITED STATES PATENTS

| | | |
|---|---|---|
| 2,225,604 | Lubs et al. | Dec. 17, 1940 |
| 2,643,958 | Kleiner | June 30, 1953 |
| 2,894,919 | Simon et al. | July 14, 1959 |
| 2,986,536 | Anderson | May 30, 1961 |

FOREIGN PATENTS

| | | |
|---|---|---|
| 779,077 | Great Britain | July 17, 1957 |
| 1,158,250 | France | Jan. 20, 1958 |

OTHER REFERENCES

Noller: "Chemistry of Organic Compounds," page 654, copyright 1951, published by W. B. Saunders Company, Philadelphia, Pa.